May 28, 1935.  W. J. ALBERSHEIM  2,003,029

SOUND PICTURE SYSTEM

Filed Aug. 23, 1934

INVENTOR
W. J. ALBERSHEIM
BY
J. G. Roberts
ATTORNEY

Patented May 28, 1935

2,003,029

UNITED STATES PATENT OFFICE 2,003,029

SOUND PICTURE SYSTEM

Walter J. Albersheim, New York, N. Y., assignor to Electrical Research Products, Inc., New York, N. Y., a corporation of Delaware Application August 23, 1934, Serial No. 741,037

6 Claims. (Cl. 179—100.3)

This invention relates to a sprocket wheel, and more particularly to a sprocket wheel for feeding a sound picture film at uniform velocity through sound translating apparatus.

In the art of sound translation, difficulty is experienced from imperfect registration of film perforations with sprocket teeth which, under some film conditions, produce noticeable sound pitch variations. Slight mechanical variations in sprockets and film perforation spacing appear as a result of manufacturing errors, but the more troublesome variations are caused by changes in the condition of the film after it has been manufactured. These film changes depend upon weather conditions, handling, or a combination of conditions which are at present beyond control. The foregoing mechanical variations introduce film velocity variations which are not a constant factor but which are predominantly of the frequency of 96 cycles per second, generally known as film flutter. An example of this may be set forth in the case of a shrunken film having the usual number of perforations engaged with the teeth of the sprocket which feeds the film through the sound translating area. Since the perforations of a shrunken film are spaced closer together than the teeth of the sprocket, only the film edge of the leading perforation is solidly and accurately engaged with the leading sprocket tooth. When the sprocket tooth disengages this leading perforation, there is a slight backward shift of the film as the next perforation fits solidly over the subsequent leading sprocket tooth. This is continuous at the rate of approximately 96 times per second, which variation introduces a continuous sound wave distortion.

The object of this invention is therefore to provide a film feeding sprocket with sprocket teeth arranged to yield sufficiently to register perfectly with film perforations which are accurately or inaccurately spaced and damped sufficiently to resist vibrations.

One embodiment of the invention comprises a sprocket wheel having the sprocket teeth mounted with individual spring members, of such length as to accommodate the movement of the sprocket tooth into alignment with the film perforation. A resistance member in the form of rubber or other pliant substance may be placed between the individual springs to damp the action of the springs at the instant of engagement or disengagement of the sprocket tooth with the film, and to resist load variations. The edges of a plurality of film perforations are thus simultaneously engaged accurately with a plurality of sprocket teeth. In practice, at least three teeth are in full engagement with the film. The sprocket teeth engaged with the film will therefore be held in the same spaced relation as the film perforations, which prevents any shifting of the film upon the disengagement of the teeth from the film perforations. The drag of load variations, which occur from various causes at the film tensioning unit of the sound translating apparatus, is now resisted by a plurality of sprocket tooth springs solidly engaged with the film plus a plurality of resistance members between the springs. The sprocket wheel of the invention is, therefore, a composite wheel with individual sprocket tooth members which are resilient upon successive engagement with film perforations, but which are formed by the film into substantially a solid wheel to prevent film flutter and load variations.

In the illustrated embodiment,

Figure 1:
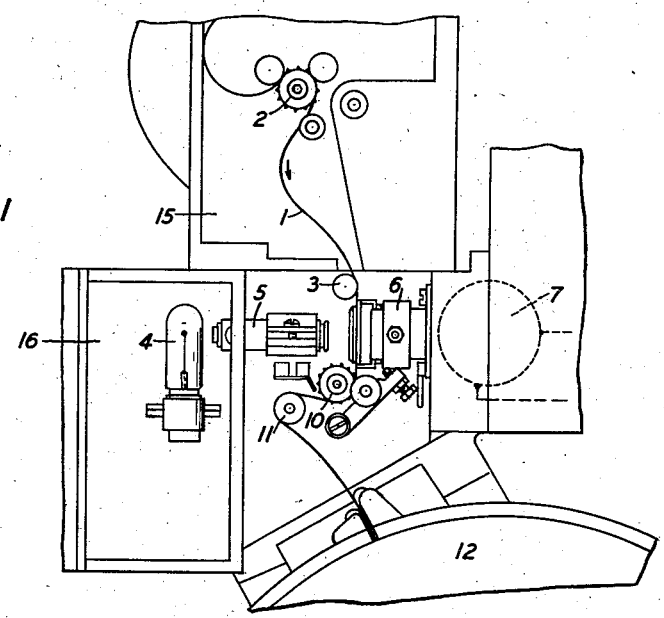
Fig. 1 shows the mechanism for guiding a film through sound picture apparatus.

Referring to Fig. 1 the sprocket according to the invention is shown as part of the sound unit of a projector. It is, however, contemplated that this sprocket be used in any character of sound picture apparatus. For the sake of simplicity the apparatus of the picture head, reels, and common driving motor with interconnecting gears and belts for synchronously driving the sound picture apparatus have been omitted. The film 1 is of the usual type having both picture and sound records thereon. This film is fed from the delivery reel to the intermediate film feeding device of the picture head 15 from which it is withdrawn by sprocket 2. A loop is formed between sprocket 2 and the guide roller 3 to prevent the possible transmission of flutter from the sprocket 2 to the point of sound translation. The sound translating unit may be of the usual type which is herein shown as comprising lamp 4, optical unit 5, film gate 6 and light sensitive cell 7 which has conductors leading to an amplifying unit. A film feeding sprocket 10 withdraws the film from the sound translating unit which film is then guided over the guide roller 11 to the take-up reel 12.

Figure 2:
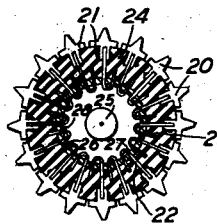
Figs. 2 and 3 illustrate sectional views of sprockets according to the invention.
Figure 3:
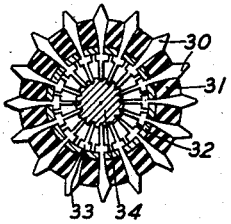

As hereinbefore stated any slight mechanical variations in the ordinary type of sprocket placed in the position of sprocket 10, or mechanical variations in the film which is fed by this sprocket, introduce velocity variations at the point of sound translation which are predominately of the frequency of 96 cycles per second. The sprocket 10 is illustrated in Figs. 2, 3, 4 and 5 with individual teeth having resilient stems arranged to fit with inaccurately spaced film perforations without introducing any irregularity of motion to the film. The sprocket shown in Fig. 2 comprises a plurality of sprocket teeth 20 rigidly secured to resilient members 22—23 herein disclosed in the form of springs extending through supporting slots 27 and 28. Pliant damping members 24 are placed between the resilient springs 22. The spring portion 23 is extended outward as a secondary damping means to restrain the movements of the springs 22. A sprocket of the same type is shown in Fig. 3 which comprises a plurality of individual sprocket teeth 20 having resilient stems extending through slots of a supporting cylinder 32 with the inward ends of the stems positioned in grooves of a central hub 34. Extensions 33 on either side of the stem fit the inner annular surface of cylinder 32 for positioning the radiant points of the sprocket teeth. The slots 36 (Fig. 4) may be arranged to hold the sprocket teeth in perfect alignment and also permit resiliency in both the section of the stem inside cylinder 32 and the section outside the cylinder. In this modification the cylindrical portion of the sprocket which is brought into contact with the film is made of rubber or other pliant material with sections extending between the sprocket teeth. This pliant material in the sprocket of either modification, Fig. 2 or Fig. 3 is sufficiently pliable to be compressed by the movement of the sprocket teeth when registering with perforations of a film having mechanical irregularities.

Figure 5:
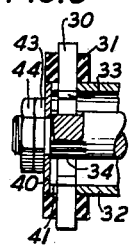
Figs. 4 and 5 illustrate the manner of assembling the mechanism of the sprocket.
Figure 4:
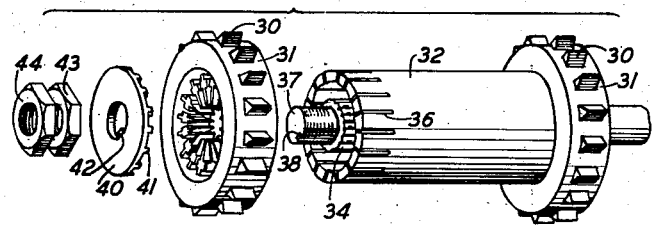

The manner of assembling and driving the sprocket is best understood by reference to Figs. 4 and 5. Fig. 4 illustrates one cylindrical sprocket tooth member assembled with the cylinder 32 and another cylindrical sprocket tooth member disassembled. Fig. 5 is a section of an assembled sprocket member. The sprocket wheel shown in Fig. 4 is according to the design shown in Fig. 3. The same assembly and driving arrangement may be used for the sprocket design as shown in Fig. 2. The resilient sprocket teeth are preferably formed in the rubber cylinder 31 which are accurately held in position during the forming of the rubber cylinder. The sprocket teeth are then assembled with the cylinder 32 by pressing the sprocket tooth stems into the slots 36 of the cylinder 32 as shown in Fig. 5. The inner ends of the sprocket teeth fit accurately into the grooves of hub 34. In the case of a design such as shown in Fig. 2 the spring member is fitted into two slots such as 36 instead of one slot. To complete the assembly the driving key 40 is positioned on shaft 37 with key 42 in keyway 38. The splines 41 are fitted into the slots 36 of the cylinder 32. The driving ring 40 is tightened in place by the nut 43 and lock nut 44. With this arrangement the driving shaft 38 drives the sprocket teeth through the agency of ring 40, splines 41 and the cylinder or spline member 32 as shown in Fig. 5.

A pliant substance between the sprocket teeth, such as 24 and 31 is essential to dampen the movements of the teeth for eliminating the possibility of vibrations when the teeth are associated with or dissociated from a film having mechanical irregularities. It is recognized that without such a damping medium the sprocket teeth under the control of a resilient stem might have a tendency to produce slight oscillations which would be reflected through the film material to the point of sound translation and thus produce slight sound distortions.

While certain novel features of the invention have been shown and described and recited in the annexed claims, it will be understood that substitutions and changes in the methods, forms and details illustrated and in their operation may be made without departing from the spirit of the invention.

What is claimed is:

1. In combination, a sound translating unit, a film having sprocket tooth perforations subject to mechanical variations, a sprocket wheel for feeding said film at uniform velocity past said sound translating unit comprising a driving member, a plurality of sprocket teeth with individual resilient members, and means in said driving member for supporting said resilient members in equally spaced relation.

2. In combination, a sound translating unit, a film having sprocket tooth perforations subject to mechanical variations, a sprocket wheel for feeding said film at uniform velocity past said sound translating unit comprising a driving member, means including resilient members for causing accurate registration of the sprocket teeth and film perforations, and means in said driving member for normally supporting said sprocket teeth in equally spaced relation.

3. In combination, a sound translating unit, a film having sprocket tooth perforations subject to mechanical variations, a sprocket wheel for feeding said film at uniform velocity past said sound translating unit including resilient members for causing accurate registration of the sprocket teeth and film perforations, and means for normally supporting said sprocket teeth and resilient members including compressible damping members between said resilient members.

4. In combination, a sound translating unit, a film having sprocket tooth perforations subject to mechanical variations, a sprocket wheel for feeding said film at uniform velocity past said sound translating unit, and means in said sprocket wheel for causing accurate registration of the sprocket teeth with inaccurately spaced film perforations including sprocket teeth with individual resilient members and a pliant cylinder having sections extending between said resilient members for damping the movements of the sprocket teeth when engaging and disengaging the film.

5. In combination, a sound translating unit, a film having sprocket tooth perforations subject to mechanical variations, a sprocket wheel for feeding said film past the sound translating unit, so arranged that the spaced relation of the plurality of sprocket teeth engaged with the film is governed by the spaced relation of the film perforations, said sprocket wheel comprising individual teeth with resilient members and compressible resistance members extending between said resilient members for damping the movement of the sprocket teeth.

6. In combination, a sound translating unit, a film having sprocket tooth perforations subject to mechanical variations, a sprocket wheel for feeding said film past the sound translating unit so arranged that the spaced relation of the plurality of sprocket teeth engaged with the film is governed by the spaced relation of the film perforations to prevent sound wave distortion, said sprocket wheel comprising individual teeth with resilient stems having their outer sections encased in a compressible damping member.

WALTER J. ALBERSHEIM.